US006782407B1

(12) United States Patent
Goff et al.

(10) Patent No.: US 6,782,407 B1
(45) Date of Patent: Aug. 24, 2004

(54) SYSTEM AND METHOD FOR LOW OVERHEAD BOUNDARY CHECKING OF JAVA ARRAYS

(75) Inventors: Lonnie C. Goff, Tempe, AZ (US); David R. Evoy, Tempe, AZ (US); Menno M. Lindwer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 673 days.

(21) Appl. No.: 09/670,496

(22) Filed: Sep. 26, 2000

(51) Int. Cl.[7] .................................................. G06F 9/00
(52) U.S. Cl. .......................................... 709/1; 718/100
(58) Field of Search ................................ 711/200, 201; 712/204, 208, 210; 714/724, 726

(56) References Cited

U.S. PATENT DOCUMENTS

| 5,983,340 | A | | 11/1999 | Garey et al. |
| 5,991,863 | A | | 11/1999 | Dao et al. |
| 5,995,747 | A | | 11/1999 | Guttag et al. |
| 6,009,505 | A | | 12/1999 | Thayer et al. |
| 6,014,723 | A | * | 1/2000 | Tremblay et al. ............... 711/1 |
| 6,026,484 | A | | 2/2000 | Golston |
| 6,026,485 | A | | 2/2000 | O Connor et al. |

FOREIGN PATENT DOCUMENTS

| EP | 0 540 155 | 5/1993 |
| WO | WO 97 27544 | 7/1997 |

* cited by examiner

*Primary Examiner*—John Follansbee
*Assistant Examiner*—Ashok Patel
(74) *Attorney, Agent, or Firm*—Michael J. Ure

(57) ABSTRACT

An array boundary checking method is disclosed for providing hardware based array boundary checking in a Java environment. During the first machine cycle of a current array access command, an array reference value is loaded into a system-data address controller and an array boundary checker. Next, during the second machine cycle of the current array access command, an array index value is written to the system-data address controller and the array boundary checker. Also during the second machine cycle of the current array access command, a maximum array index value is read from the Java array and written to the array boundary checker. The array boundary checker utilizes these values to determine the validity of the current array access command. Finally, during the third machine cycle an array value is accessed in memory. In the present invention the array value is only accessed when the current array access command is valid.

20 Claims, 7 Drawing Sheets

SYSTEM AND METHOD FOR LOW OVERHEAD BOUNDARY CHECKING OF JAVA ARRAYS

CROSS REFERENCE TO RELATED APPLICATIONS

This application is related to U.S. patent application Ser. No. 09/565,679, filed on May 4, 2000, entitled "ARCHITECTURE FOR AN INTEGRATED SUBSYSTEM HAVING A JAVA STACK, ARITHMETIC LOGIC UNIT AND MULTIPLE STACKPOINT AND METHODS FOR USING THE SAME," which is hereby incorporated by reference in its entirety.

This application is also related to U.S. patent application Ser. No. 09/645,468 entitled "SYSTEM AND METHOD FOR POWER MANAGEMENT IN A JAVA ACCELERATOR ENVIRONMENT," which is hereby incorporated by reference in its entirety.

BACKGROUND OF THE INVENTION

1. Field of the Invention

This invention relates generally to Java system performance, and more particularly to systems and methods for low overhead Java array boundary checking.

2. Description of the Related Art

Today's world of computer programming offers many high-level programming languages. Java, for example, has achieved widespread use in a relatively short period of time and is largely attributed with the ubiquitous success of the Internet. The popularity of Java is due, at least in part, to its platform independence, object orientation and dynamic nature. In addition, Java removes many of the tedious and error-prone tasks which must be performed by an application programmer, including memory management and cross-platform porting. In this manner, the Java programmer can better focus on design and functionality issues.

To execute a Java application, a Java processor is used, which is typically realized only by software in form of a Java Virtual Machine (JVM). However, because of the problems associated with implementing a process in software, the JVM is plagued with slow performance issues. Further, certain robustness features required to obtain Java certification for a JVM exacerbate the slow performance issues encountered in conventional JVMs.

One such robustness feature is array boundary checking. Thus, to get certification on a JVM, boundary checking must be performed whenever an array is accessed.

By way of background, many Java applications utilize arrays, which are an arrangement of information in one or more dimensions, e.g., a list, a table, or a multidimensional arrangement of data. Whenever an array is realized in memory using Java, the size of the array is stored in memory along with any data referenced by the array. Generally, the Java array size is stored as the first element in the array.

For example, a one-hundred element array in Java will have the number one-hundred stored as the first element of the array. Thus, in order to keep the required number of elements free for data storage, arrays in Java are typically larger than would otherwise need to be in order to store a particular number of elements.

As mention previously, as instructions are interpreted by a JVM, one the operations that must be performed by the interpreter is an array boundary check. Specifically, whenever a Java array is accessed by a Java application, an array boundary check must be performed to ensure that before the array is accessed, the array size is checked to make sure that the element attempting to be accessed is not outside the boundary of the array. In addition, the array reference itself is also checked to ensure that it is a valid array reference.

When an array access command attempts to access an element outside the boundary of the array an exception is triggered. In addition, an exception is triggered when an array access command is attempted with an invalid array reference. Generally, the raised exceptions are configured to prevent memory access when they are raised.

Array boundary checking results in a more robust system since array access commands have access only to those data elements defined by the array, and no access to adjacent data is possible, resulting in fewer bugs and improved system security. However, the step-by-step comparison and verification required for array boundary checking, which typically requires at least one cycle per step, consumes valuable processing time until a verification occurs.

Since JVMs have conventionally been implemented in software, boundary checking in JAVA is typically a process that adds extra machine cycles every time an array is accessed. The extra machine cycles utilized for array boundary checking greatly reduce the operating efficiency of the system, which only serves to further exacerbate an already slow, software-based, interpretive process.

In view of the forgoing, there is a need for improved methods for array boundary checking. The methods should reduce the overhead associated with array boundary checking, thereby significantly reducing the time required to retrieve array information and verify its size relative to conventional systems.

SUMMARY OF THE INVENTION

Broadly speaking, the present invention fills these needs by performing array boundary checking during the same machine cycles that are used to perform an array access command. By performing array boundary checking in parallel with the array access command, the array boundary checker of the present invention avoids the additional overhead conventionally associated with array boundary checking.

In one embodiment, an array boundary checking method is disclosed that provides hardware based array boundary checking in a Java environment. During the first machine cycle of a current array access command, an array reference value is loaded into a system-data address controller and an array boundary checker. Next, during the second machine cycle of the current array access command, an array index value is written to the system-data address controller and the array boundary checker. Also during the second machine cycle of the current array access command, a maximum array index value is written to the array boundary checker. The array boundary checker utilizes these values to determine the validity of the current array access command.

Finally, during the third machine cycle an array value is accessed in memory. In the present invention the array value is only accessed when the current array access command is valid.

In another embodiment, an array boundary checking system that provides array boundary checking in a Java environment is disclosed. The array boundary checking system includes a system-data address controller that has a first array reference register and a first array index register. In addition the array boundary checking system includes an array boundary checker that is coupled to the system-data address controller via a first data bus and a second data bus. The array boundary checker includes a second array reference register, a second array index register, and a maximum array index register. In operation, the second array index register and the maximum array index register are capable of being loaded during a single machine cycle via the first data bus and the second data bus, thus saving machine cycles when performing array boundary checking.

Another array boundary checking method for providing hardware based array boundary checking in a Java environment is disclosed in yet another embodiment of the present invention. The method begins with an array reference value being written to an array reference register via a first data bus. Then, an array index value is loaded into an array index register using the first data bus. During the same machine cycle that the array index register is loaded, a maximum array index value is loaded into a maximum array index register using a second data bus. To determine the validity of a current array access command, the array reference value, the array index value, and the maximum array index value are analyzed.

Advantageously, the present invention provides array boundary checking without adding additional overhead to the system. By performing the array boundary checking in parallel with the actual array access, the present invention conforms with Java array boundary checking conventions without the need of extra machine cycles, thus greatly enhancing the performance of the Java processor. Moreover, the use of dual data buses allows multiple registers to be loaded during a single machine cycle, thus further enhancing the Java processor performance.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for an array boundary checker for use in a Java environment. The present invention provides array boundary checking with no overhead by performing the array boundary checking during the same machine cycles utilized to reference an array. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

The array boundary checker of the present invention is preferably embodied in a three-stage hardware based Java processor. One exemplary Java processor is discussed next with reference to the FIG. 1.

Figure 1:
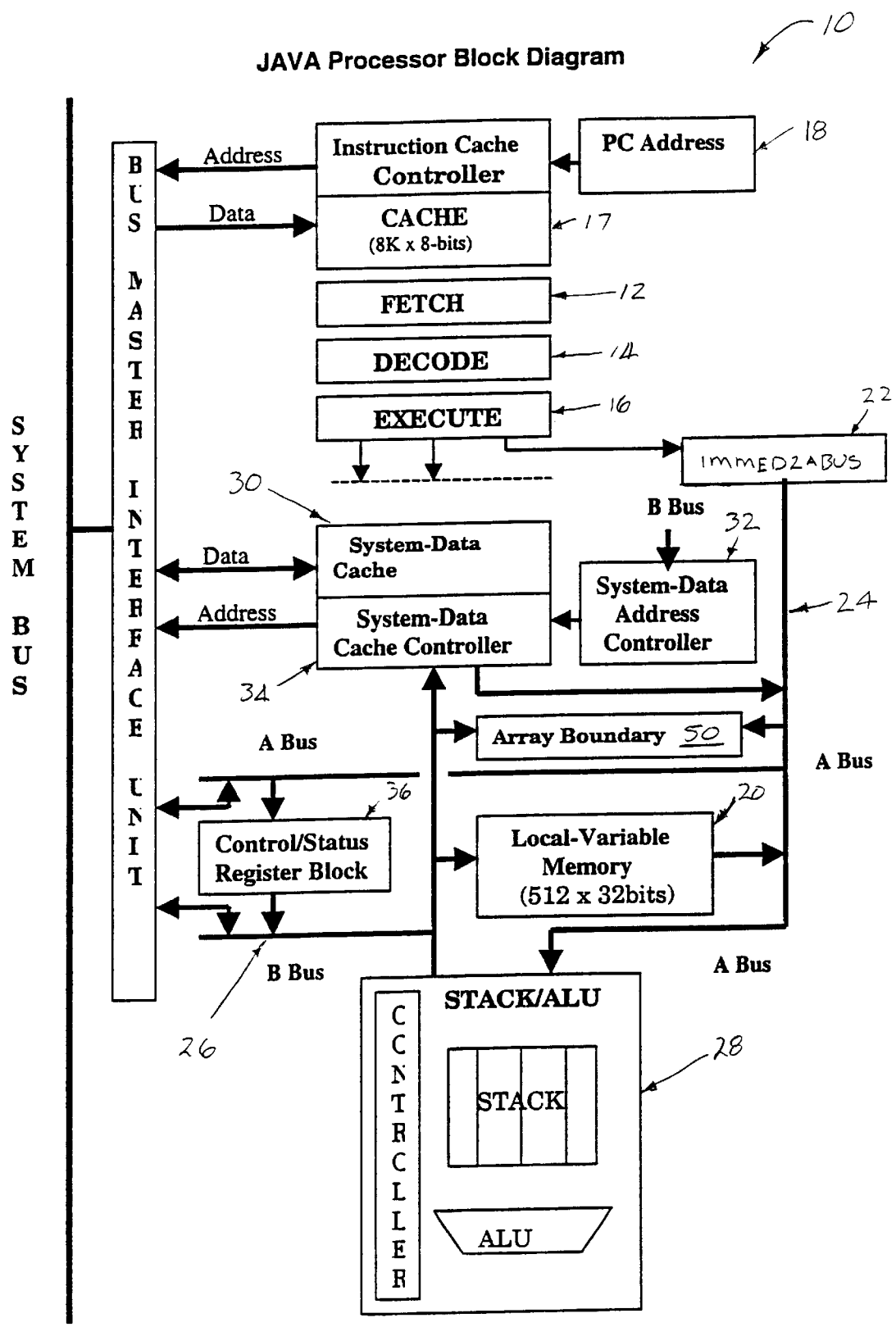
FIG. 1 is a block diagram showing a Java processor having an array boundary checker, in accordance with an embodiment of the present invention.

FIG. 1 is a block diagram showing a Java processor 10 having an array boundary checker 50, in accordance with an embodiment of the present invention. The Java processor 10 includes a three-stage pipeline associated with an instruction subsystem, which includes a fetch stage 12, a decode stage 14, and an execute stage 16. The fetch stage 12 obtains instructions by fetching one bytecode per machine cycle from the instruction cache 17, and incrementing Program Counter (PC) address controller 18 by one after each fetch. When needed, the fetch stage 12 performs multiple fetches in order to create a single Java instruction requiring multiple bytecodes.

The instruction is then passed to the decode stage 14, which interprets the instruction. Specifically, the decode stage 14 decodes the instruction into one or more machine micro-coded instructions, which are then executed by the execution stage 16. Generally, one micro-coded instruction is passed to the execution stage 16 at the beginning of each machine cycle.

After the last micro-coded instruction is completed in the execution stage 16, the PC address controller 18 is updated. The PC address controller 18 is updated according to the number of bytecodes in the Java instruction currently being executed.

The output of the execution stage 16 includes control signals that are routed throughout the Java processor 10. In addition, the output of the execution stage 16 includes an address field, which is routed to a Local-Variable memory 20 and an immediate data field 22 using an A data bus 24.

Two data buses are included in the Java processor 10, the A data bus 24, and a B data bus 26. In addition, the Java processor 10 includes two data subsystems. One data subsystem includes the Local-Variable memory 20, and the stack and ALU subsystem 28 used by Java instructions during execution. The other data system includes a system-data cache 30 and array boundary checker 50.

The Local-Variable memory 20 includes high performance asynchronous SRAM, which is single ported and accessible by both the Java processor 10 and an associated host processor (not shown). When the Java processor 10 is in operation, the host processor is preferably locked out of the Local Variable memory 20. An ADR/16 field in the micro-coded instruction serves as an address register, which can be optionally incremented by one under micro-control before being presented to the SRAM. The SRAM is preferably 512 by 32-bits, and is accessible in 32 bit chunks of data. Preferably, the output data port of the SRAM is coupled to the A bus 24, while the input data port of the SRAM is coupled to the B data bus 26.

A stack and ALU subsystem 28 is also included in the Java Processor 10. The stack is preferably built from a register file and includes sixty-four 32-bit wide words, organized in four banks, each bank being about 16 words deep. The stack and ALU subsystem 28 obtains input from the A data bus 24, and provides output to the B data bus 26. When arithmetic operations are performed, the ALU reads data from an appropriate bank, or banks, and asserts a WAIT signal until after it has finished the arithmetic operation and has written the result back to the appropriate bank, or banks.

The system-data cache 30 includes a high performance write-back cache, and preferably implements a write-allocate policy, wherein a new line is allocated for a write miss. Generally, the system data cache 30 is used as a high performance portal to the Java Heap and Constant Pool. Preferably, the system-data cache 30 is configured as a 512×32-bit wide memory with support for 8-bit and 16-bit accesses.

During an array access the system-data cache 30 operates closely with the array bounder checker 50. Specifically, when an array is accessed, the location of the array is retrieved from the stack and ALU subsystem 28 and stored in a system-data address controller 32. The location of the array is stored in form of an array reference, which is the base address of the array. After retrieving the array reference, the array index is retrieved from the stack and ALU subsystem 28 and stored in the system-data address controller 32. Then, using a system-data cache controller 34, the data is then read from, or written to, the system-data cache 30 at the location specified by the array reference and the array index.

The array boundary checker 50 operates in parallel with the above operations during array accesses. Using both the A data bus 24 and the B data bus 26, the array boundary checker 50 makes two types of array boundary checks during each array access. Specifically, the array boundary checker 50 checks for a NULL array reference, and an out-of-range array index error. A NULL reference occurs when an array access command is attempted with an array reference that has not yet been defined by the Java application. An out-of-range array index error occurs when an array access command is attempted using an array index that is greater than the maximum array index value.

If either of the above errors is detected, an appropriate error signal is generated, which in turn causes a write access to the array to get blocked, and a read access to the array to get effectively ignored. In addition, the same error signal also causes an Exception Status register in a Control/Status register block 36 to get updated with one of the two values that are used to identify the error type. The error signal selects an appropriate value and latches it into the Exception Status register in a Control/Status register block 36, and an exception signal is sent to the host processor. The Java processor 10 is then halted.

Figure 2:
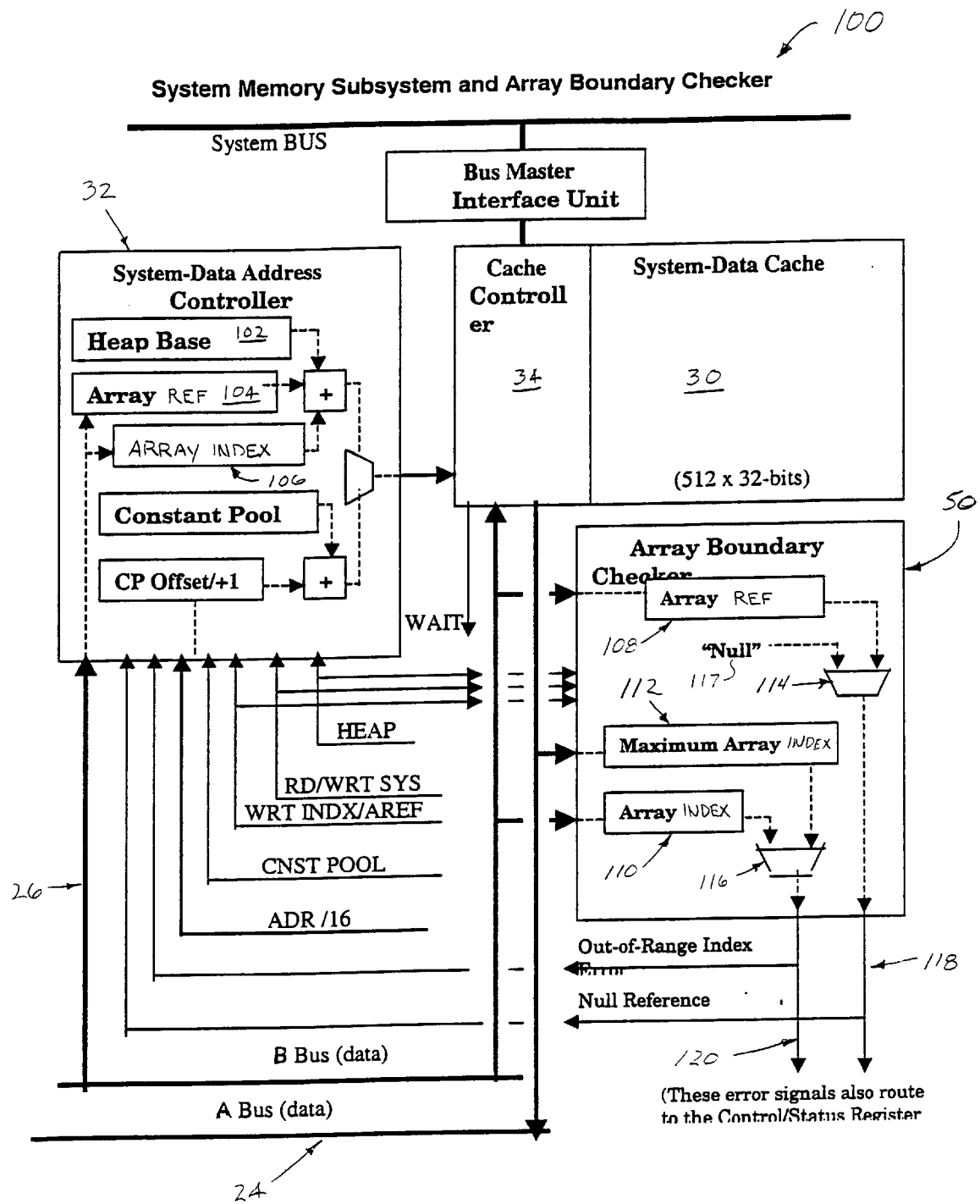
FIG. 2 is a block diagram showing a system memory and array boundary checker subsystem, in accordance with an embodiment of the present invention.

FIG. 2 is a block diagram showing a system memory and array boundary checker subsystem 100, in accordance with an embodiment of the present invention. The system memory and array boundary checker subsystem 100 includes the A data bus 24 and the B data bus 26 coupled to the system-data cache 30, the system-data address controller 32, the system-data cache controller 34, and the array boundary checker 50.

The system-data address controller 32 includes a Heap base register 102, an array reference register 104, and an array index register 106. In use, when an array access command is executed, the host processor generally will already have loaded the Heap base register 102 to allow access to the Heap. Then, the B data bus 26 is used to load an array reference value into the array reference register 104 of the system-data address controller 32. As mentioned previously, the array reference value is obtained from the stack and ALU subsystem using the B data bus 26.

Next, an array index value is loaded into the array index register 106. Similar to the array reference value, the array index value is obtained from the stack and ALU subsystem using the B data bus 26. The array reference value stored in the array reference register 102 and the array index value stored in the array index register 106 will then be used to access the array data stored in the system data cache 30 via the system-data cache controller 34.

Generally, the above operations use three machine cycles to execute. During these three machine cycles, the array boundary checker 50 operates in parallel with the system-data address controller 32 to perform the array boundary checking.

The array boundary checker 50 includes an array reference register 108, an array index register 110, and a maximum array index register 112. A first comparator 114 is coupled to the array reference register 108 and a NULL value 117, and a second comparator 116 is coupled to the array index register 110 and the maximum array index register 112. The output of the first comparator 114 provides a NULL reference signal 118 to the system, and the output of the second comparator 116 provides an Out-of Range Index signal 120.

During the first machine cycle, of the three machine cycles used for an array access, the array reference register 108 is loaded. When the array reference value is read from the stack and ALU subsystem, it is provided to the array reference register 108 of the array boundary checker 50 using the B data bus 26. As can be seen from FIG. 2, the B data bus 26 is also coupled to the system-data address controller 32. Thus, during the first machine cycle, the array reference value is provided to both the system-data address controller 32 and the array boundary checker 50 using the B data bus 26.

Having obtained the array reference value in the array reference register 108 of the array boundary checker 50, the first comparator 114 is used to compare the array reference value with the NULL value 117. If the array reference value stored in the array reference register 108 is equal to the NULL value 117, the NULL reference signal 118 is asserted by the first comparator 114.

The array index register 110 and the maximum array index register 112 are then loaded in the second machine cycle of the three machine cycles used to access the array. Similar to the array reference value, the array index value is read from the stack and ALU subsystem and provided to the array index register 110 of the array boundary checker 50 using the B data bus 26. As with the array reference value, the array index value is provided to both the system-data address controller 32 and the array boundary checker 50 using the B data bus 26, which is coupled to both systems.

In addition to the array index value, the maximum array index value is provided to the array boundary checker 50 during the second machine cycle. The maximum array index value is read from the array and stored in the maximum array index register 112 of the array boundary checker 50 using the A data bus 24. As stated previously, all arrays in the Java language store the size of the array along with the generally data of the array. The boundary checker 50 uses this array size value as the maximum array index value.

It should be noted that the array boundary checker 50 of the present invention is capable of loading both the array index register 110 and the maximum array index register 112 during the same machine cycle because it includes two data buses, namely the A data bus 24 and the B data bus 26. Hence, the A data bus 24 is used to load the maximum array index register 112, and the B data bus to load the array index register 110 in parallel with the maximum array index register 112.

Having obtained the array index value and the maximum array index value, the second comparator 116 compares the array index value stored in the array index register 110 with the maximum array index value stored in the maximum array index register 112. If the array index value is greater than the maximum array index value, the second comparator 116 asserts the Out-of-Range Index signal 120.

In this manner, the array boundary checker 50 of the present invention performs array boundary checking without utilizing extra machine cycles. The present invention is able to operate in this manner because the boundary checker 50 utilizes the same machine cycles as are used by the system-data address controller 32 to actually load the array value. More specifically, the array boundary checker 50 of the present invention uses the first and second machine cycles, of the three machine cycles required to access an array, to perform the array boundary check. In the event of an error, the array boundary checker 50 asserts an array signal error signal 118/120, which in turn causes the array access to be blocked or ignored, as described in greater detail next with reference to FIG. 3.

Figure 3:
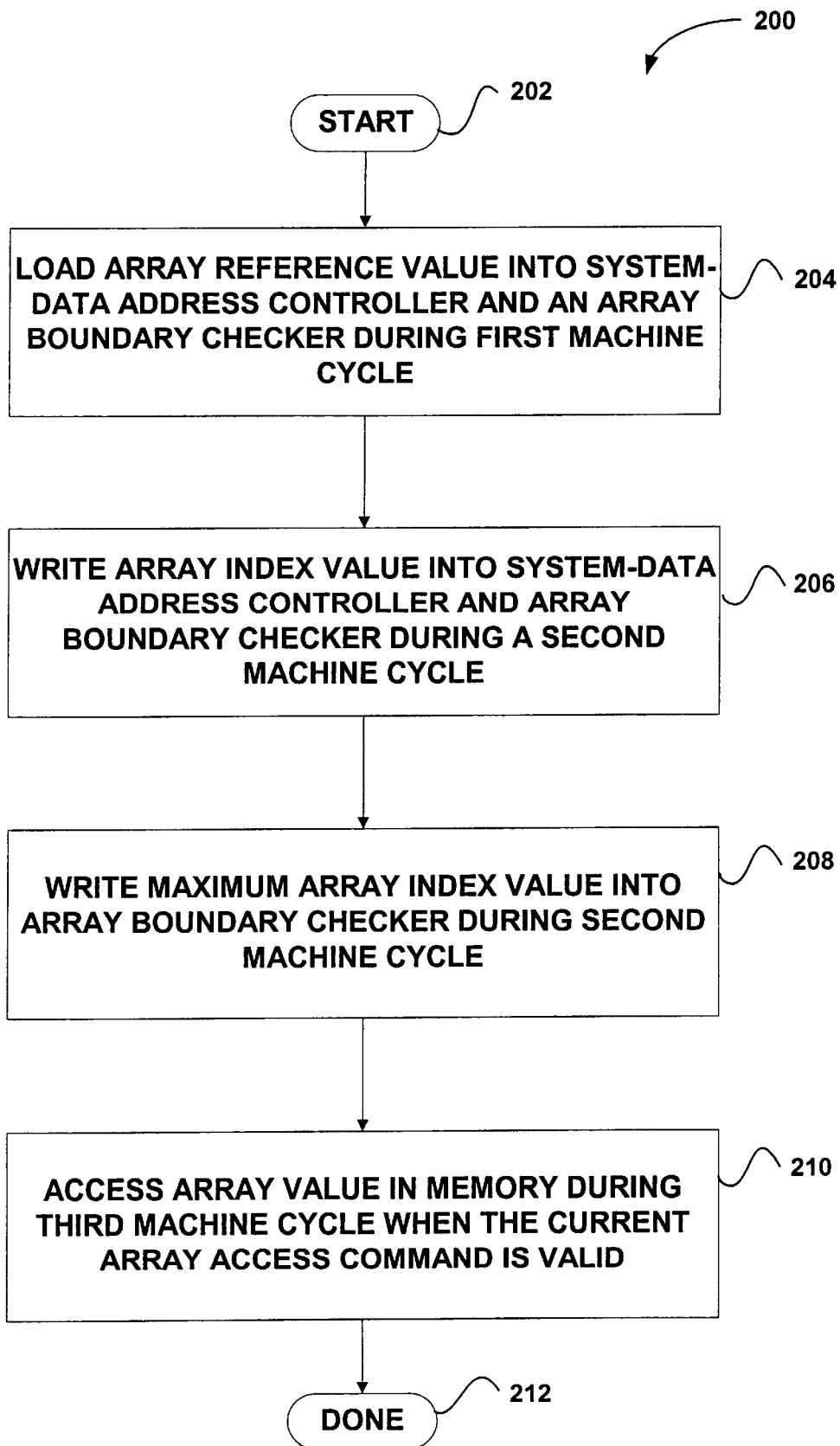
FIG. 3 is a flowchart showing a method for performing array boundary checking, in accordance with an embodiment of the present invention.

FIG. 3 is a flowchart showing a method 200 for performing array boundary checking, in accordance with an embodiment of the present invention. In an initial operation 202, preprocess operations are performed. Preprocess operations include fetching and decoding the array access command, and other preprocess operations that will be apparent to those skilled in the art.

In an array reference value operation 204, the array reference value is loaded into both the system-data address controller and the array boundary checker during the first machine cycle of the three machine cycles needed to load access an array. As mentioned previously, the array reference value is stored in the stack and ALU subsystem by the time the array access is performed. This value is then read from the stack and ALU subsystem and provided to both the system-data address controller and the array boundary checker using the B data bus.

Figure 4:
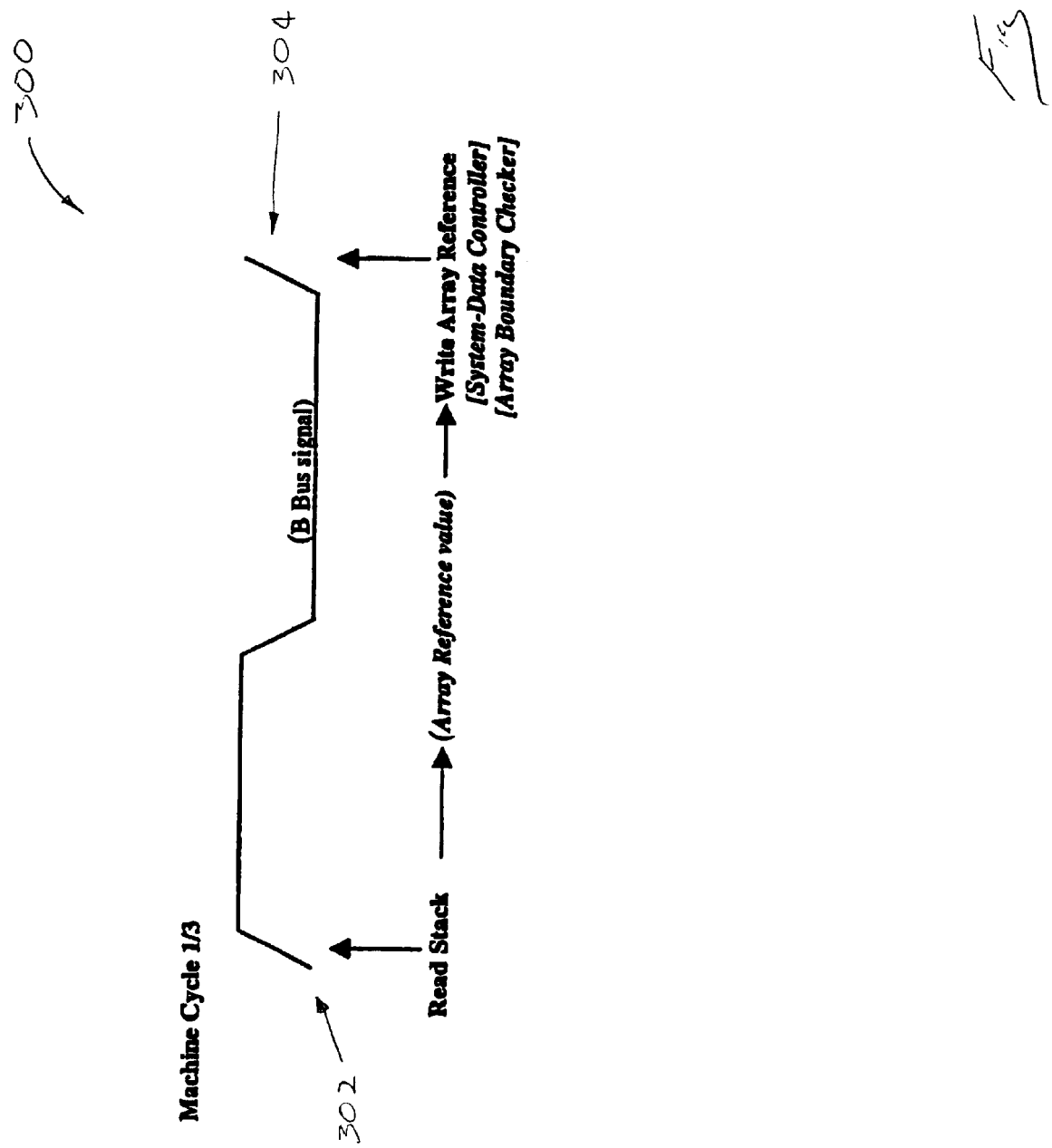
FIG. 4 is timing diagram showing the first machine cycle of the three machine cycles used to access an array value, in accordance with an embodiment of the present invention.

FIG. 4 is timing diagram showing the first machine cycle 300 of the three machine cycles used to access an array value, in accordance with an embodiment of the present invention. During the first machine cycle 300, a 32-bit array reference value is read from the stack at location "top-minus-1" and placed on the B data bus. As shown in FIG. 4, the array reference value is read from the stack at the leading edge 302 of the first machine cycle 300.

The array reference value is then written to both the array reference register in the system-data address controller and the array reference register in the array boundary checker during the trailing edge 304 of the first machine cycle 300. Thus, the same signal required to load the array reference register in the system-data address controller also performs a simultaneous load of the array reference register in the array boundary checker.

Thereafter, both the array reference register in the system-data address controller and the array reference register in the array boundary checker include an address that points to the first location of the requested array. The array boundary checker then checks the validity of the array reference value by comparing it to a NULL value, and generating a NULL reference signal if the array reference value is NULL.

Referring back to FIG. 3, the array index value is loaded into both the system-data address controller and the array boundary checker during the second machine cycle of the three machine cycles needed to load access an array, in an array index value operation 206. Similar to the array reference value, the array index value is stored in the stack and ALU subsystem. The array index value is read from the stack and ALU subsystem and provided to both the system-data address controller and the array boundary checker using the B data bus.

Figure 5:
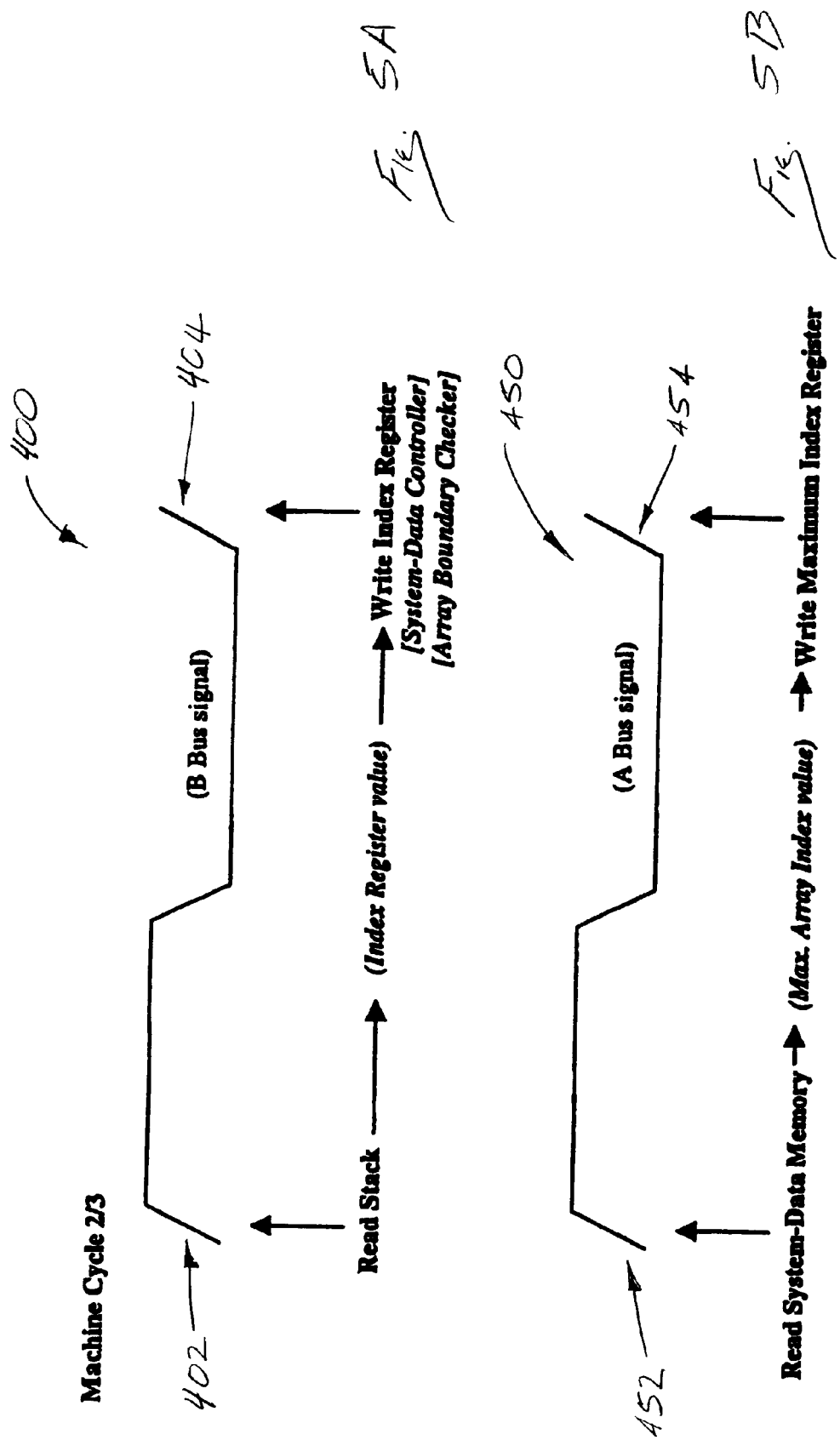
FIG. 5A is a timing diagram showing the B data bus signals during the second machine cycle of the three machine cycles used to access the array, in accordance with an embodiment of the present invention.
FIG. 5B is a timing diagram showing the A data bus signals during the second machine cycle of the three machine cycles used to access the array, in accordance with an embodiment of the present invention.

FIG. 5A is a timing diagram 400 showing the B data bus signals during the second machine cycle of the three machine cycles used to access the array, in accordance with an embodiment of the present invention. During the second machine cycle 400, a 32-bit array index value is read from the stack at location "top" and placed on the B data bus. As shown in FIG. 5A, the array index value is read from the stack at the leading edge 402 of the second machine cycle 400.

The array index value is then written to both the array index register in the system-data address controller and the array index register in the array boundary checker during the trailing edge 404 of the second machine cycle 400.

Thereafter, both the array index register in the system-data address controller and the array index register in the array boundary checker include an index value that indexes the requested data in the array.

Referring again to FIG. 3, the maximum array index value is also loaded into both the system-data address controller and the array boundary checker during the second machine cycle, in a maximum index value operation 208. The first location in any array in the Java language includes the number of elements the array can hold, which is the maximum array index value. Since the array reference register in the system-data address controller includes this address, and was loaded during the previous machine cycle, the array reference register in the system-data address controller is used to obtain the maximum array index value and provide it to the array boundary checker using Bus A.

FIG. 5B is a timing diagram 450 showing the A data bus signals during the second machine cycle of the three machine cycles used to access the array, in accordance with an embodiment of the present invention. During the second machine cycle 450, a maximum array index value is read from the system-data cache and placed on the A data bus. As shown in FIG. 5B, the maximum array index value is read from the system-data cache at the leading edge 452 of the second machine cycle 450, and written to the maximum array index register in the array boundary checker at the trailing edge 454 of the second machine cycle 450.

Thus, the second machine cycle 400/450 causes traffic to be generated on both the A data bus and the B data bus. Since the present invention makes use of two data buses, both the array index register and the maximum array index register in the array boundary checker can be loaded during the same machine cycle, namely, the second machine cycle 400/450. Having loaded both the array index value and the maximum array index value into the array boundary checker, the array boundary checker then checks the validity of the array index by determining whether the array index value is greater than the maximum array index value. The array boundary checker asserts an Out-of-Range Index signal when the array index value is greater than the maximum array index value.

Referring back to FIG. 3, the array value is accessed in memory during the third machine cycle of the three machine cycles used to access the array, in an array value operation 210. Generally, the array value is accessed in the system-data cache using the system-data address controller during this operation.

Figure 6:
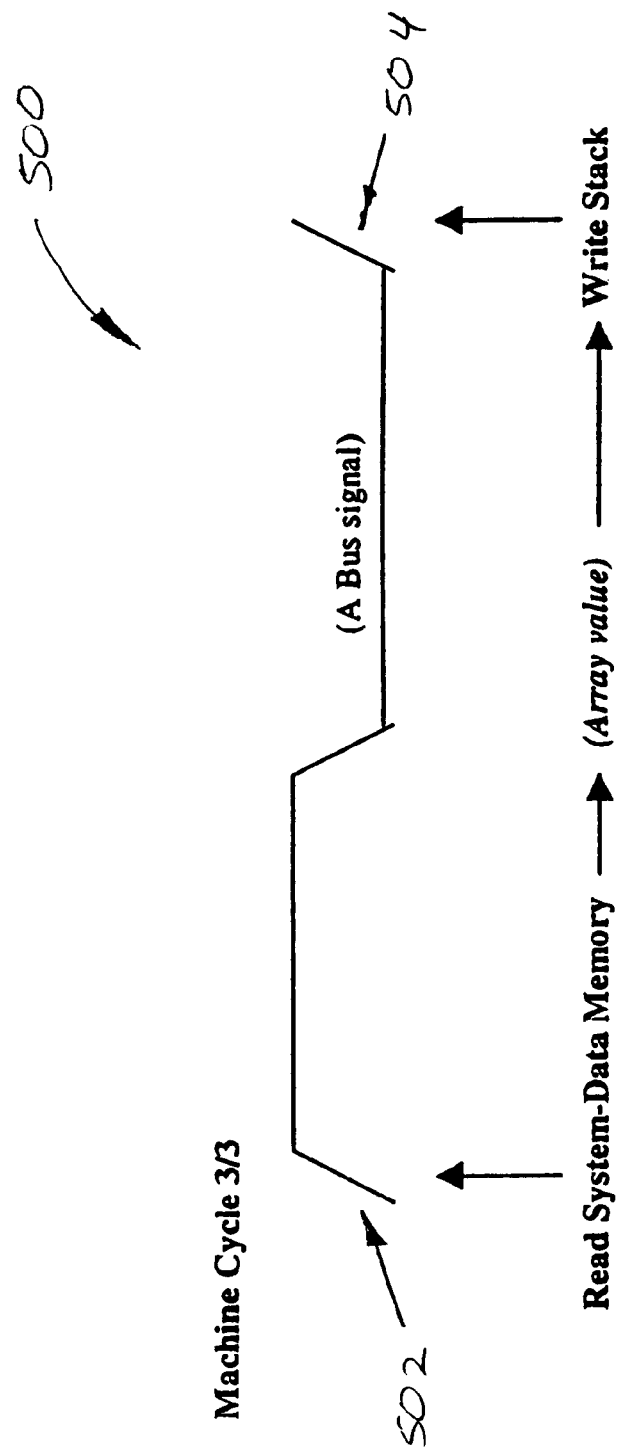
FIG. 6 is a timing diagram showing the third machine cycle of the three machine cycles used to access an array, in accordance with an embodiment of the present invention.

FIG. 6 is a timing diagram showing the third machine cycle 500 of the three machine cycles used to access an array, in accordance with an embodiment of the present invention. During the third machine cycle 500, the array value is read from the system-data cache and placed on the A data bus. As shown in FIG. 6, the array value is read from the system-data cache at the leading edge 502 of the third machine cycle 500. The array value is then written to the stack at the trailing edge 504 of the third machine cycle 500.

As set forth above, the array boundary checking has already been performed in the previous two machine cycles required to access the array value, namely, the first and second machine cycles. If either the NULL reference signal or the Out-of-Range Index signal was asserted, an exception is sent to the host processor and the Java processor is halted, preferably before the array value is accessed.

Referring back to FIG. 3, the method 200 is completed and post-process operations are performed in operation 212. Post-process operation include fetching and decoding the next Java instruction, and other post-process operations that will be apparent to those skilled in the art. Advantageously, by performing boundary checking in parallel with array access, the present invention provides fast Java array boundary checking without additional overhead.

Figure 7:
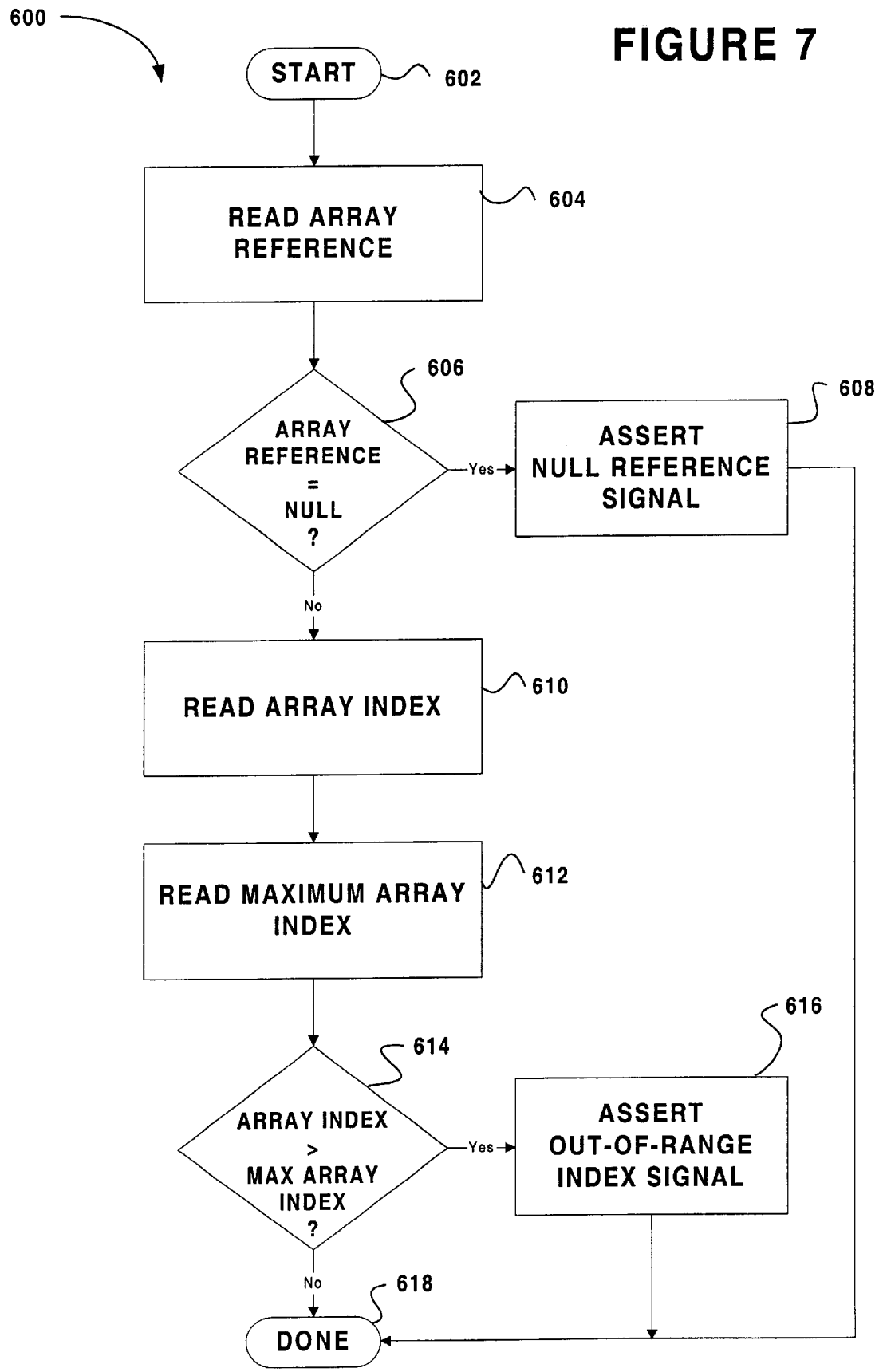
FIG. 7 is a flowchart showing a method for performing boundary checking of a Java array, in accordance with an embodiment of the present invention.

FIG. 7 is a flowchart showing a method 600 for performing boundary checking of a Java array, in accordance with an embodiment of the present invention. In an initial operation 602 preprocess operations are performed. Preprocess operations include fetching and decoding the array access command, and other preprocess operations that will be apparent to those skilled in the art.

In an array reference operation 604, an array reference is read from the stack. As mentioned previously, the array reference value is stored in the stack and ALU subsystem by the time the array access is performed. This value is read from the stack and provided to the array boundary checker using the B data bus. Specifically, During the first machine cycle, a 32-bit array reference value is read from the stack at location "topminus-1" and placed on the B data bus. The array reference value is then written to both the array reference register in the system-data address controller and the array reference register in the array boundary checker during the first machine cycle.

A decision is then made as to whether the array reference value is NULL, in operation 606. A NULL value array reference generally results from an array access of an undefined array. If the array reference value is equal to NULL, the process 600 continues with a NULL reference operation 608. However, if the array reference value is not equal to NULL, the process 600 continues with an array index operation 610.

During the NULL reference operation 608, a NULL reference signal is asserted, which informs the system that an error has been detected. To determine if a NULL reference has been used, a first comparator within the array boundary checker compares the array reference value stored in the array reference register of the array boundary checker with a NULL value. If the array reference value is equal to NULL, the NULL reference signal is asserted. Thereafter, the method 600 will be completed, and the Java processor halted, in operation 618.

In the array index operation 610, the array index value is read from the stack. Similar to the array reference value, the array index value is stored in the stack and ALU subsystem.

The array index value is read from the stack and ALU subsystem and provided to the array boundary checker using the B data bus. More specifically, during the second machine cycle, a 32-bit array index value is read from the stack at location "top" and placed on the B data bus. Thereafter, the array index value is written to both the array index register in the system-data address controller and the array index register in the array boundary checker during the second machine cycle.

The maximum array index value is also read from the system-data cache, in a maximum array index operation 612. As mentioned previously, the first location in any array in the Java language includes the number of elements the array can hold, which is the maximum array index value. Since the array reference register in the system-data address controller includes this address, and is loaded during the previous machine cycle, the array reference register in the system-data address controller is used to obtain the maximum array index value and provide it to the array boundary checker using Bus A.

Hence, during the second machine cycle, the maximum array index value is read from the system-data cache and placed on the A data bus. The maximum array index value is also written to the maximum array index register in the array boundary checker during the second machine cycle.

Since the present invention makes use of two data buses, both the array index register and the maximum array index register in the array boundary checker can be loaded during the same machine cycle, namely, the second machine cycle.

A decision is then made as to whether the array index value is greater than the maximum array index value, in operation 614. An array index value generally is greater than the maximum array index when a Java program attempts to access an array with an index value that is not within the defined boundaries of the array. Thus, if the array index value is greater than the maximum array index value, the method 600 continues with an Out-of-Range error operation 616. Otherwise, the method 600 is completed in operation 618.

An Out-of-Range signal is asserted in the Out-of-Range error operation 616. Having loaded both the array index value and the maximum array index value into the array boundary checker, the array boundary checker checks the validity of the array index.

To determine the validity of the array index value, a second comparator in the array boundary checker compares the array index value with the maximum array index value, and asserts an Out-of-Range Index signal when the array index value is greater than the maximum array index value. Thereafter, the method 600 will be completed, and the Java processor halted, in operation 618.

The method 600 is completed and post process operations are performed in operation 618. Post-process operations include halting the Java processor, continued interpretation of the Java application, and other post-process operations that will be apparent to those skilled in the art. In particular, the Java processor is halted if operation 618 is reached from either the NULL reference operation 608, or the Out-of-Range Index error operation 616. Otherwise, the Java processor will continue interpreting Java instructions until the Java application is completed, at which point control is returned to the host processor.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An array boundary checking method for providing hardware based array boundary checking in a Java environment, the array boundary checking method comprising the operations of:

loading an array reference value into a system-data address controller and an array boundary checker during a first machine cycle of a current array access command;

writing an array index value into the system-data address controller and the array boundary checker during a second machine cycle of the current array access command;

writing a maximum array index value into the array boundary checker during the second machine cycle of the current array access command; and accessing an array value in memory during a third machine cycle when the current array access command is valid.

2. An array boundary checking method as recited in claim 1, further comprising the operations of:

generating a NULL reference signal when the array reference value is NULL; and raising an Out-of-Range Index signal when the current array index value is greater than the maximum array index value.

3. An array boundary checking method as recited in claim 2, further comprising the operations of:

utilizing a first comparator to compare the array reference value to a NULL value; and utilizing a second comparator to compare the array index value to the maximum array index value.

4. An array boundary checking method as recited in claim 2, wherein the array access command is invalid when the NULL reference signal is generated, and wherein the array access command is invalid when an Out-of-Range Index signal is raised.

5. An array boundary checking method as recited in claim 4, further comprising the operation of preventing read access and write access to the memory when the array access command is invalid.

6. An array boundary checking method as recited in claim 1, wherein the array reference value and the array index value are loaded into memory using a first data bus, and wherein the maximum array index value is loaded into memory using a second data bus.

7. An array boundary checking system for providing array boundary checking in a Java environment, the array boundary checking system comprising:

a system-data address controller having a first array reference register and a first array index register; and an array boundary checker coupled to the system-data address controller via a first data bus and a second data bus, the array boundary checker having a second array reference register, a second array index register, and a maximum array index register, wherein the second array index register and the maximum array index register are capable of being loaded during a single machine cycle via the first data bus and the second data bus.

8. An array boundary checking system as recited in claim 7, wherein the first array reference register and the second array reference register are loaded during a first machine cycle utilizing the first data bus.

9. An array boundary checking system as recited in claim 8, wherein the first array index register and the second array index register are loaded during a second machine cycle utilizing the first data bus, and wherein the maximum array index register is loaded during the second machine cycle using the second data bus.

10. An array boundary checking system as recited in claim 9, wherein an array value is read from memory during a third machine cycle when a current array access command is valid.

11. An array boundary checking system as recited in claim 7, wherein the array boundary checker further includes a first comparator coupled to the second array reference register, and a second comparator coupled to the second array index register and the maximum array index register.

12. An array boundary checking system as recited in claim 11, wherein the first comparator generates a Null reference signal when an array reference value stored in the second array reference register is NULL.

13. An array boundary checking system as recited in claim 12, wherein the second comparator generates an Out-of-Range index signal when an array index value stored in the second array index register is greater than a maximum array index value stored in the maximum array index register.

14. An array boundary checking system as recited in claim 13, wherein an array access command is invalid when the NULL reference signal is generated, and wherein the array access command is invalid when the Out-of-Range Index signal is generated.

15. An array boundary checking system as recited in claim 14, wherein read access and write access to memory is prevented when the array access command is invalid.

16. An array boundary checking method for providing hardware based array boundary checking in a Java environment, the array boundary checking method comprising the operations of:

writing an array reference value to an array reference register via a first data bus;

loading an array index value into an array index register using the first data bus;

loading a maximum array index value into a maximum array index register using a second data bus, wherein the maximum array index register is loaded during the same machine cycle that the array index register is loaded; and analyzing the array reference value, the array index value, and the maximum array index value to determine a validity of a current array access command.

17. An array boundary checking method as recited in claim 16, wherein the operation of analyzing the array reference value, the array index value, and the maximum array index value comprises the operations of:

generating a NULL reference signal when the array reference value is NULL; and generating an Out-of-Range Index signal when the array index value is greater than the maximum array index value.

18. An array boundary checking method as recited in claim 17, wherein the current array access command is invalid when the NULL reference signal is generated, and wherein the current array access command is invalid if the Out-o-Range index signal is generated.

19. An array boundary checking method as recited in claim 18, further comprising the operation of preventing read access and write access to memory when the current array access command is invalid.

20. An array boundary checking method as recited in claim 19, further comprising the operation of reading an array value from memory when the current array access command is valid.

* * * * *